March 19, 1929.  R. SEFTON  1,706,187
PNEUMATIC SPRING
Filed Aug. 13, 1926  2 Sheets-Sheet 1

Inventor:
Richard Sefton,
By Jas. C. Wobensmith
Attorney.

March 19, 1929.  R. SEFTON  1,706,187
PNEUMATIC SPRING
Filed Aug. 13, 1926    2 Sheets-Sheet 2
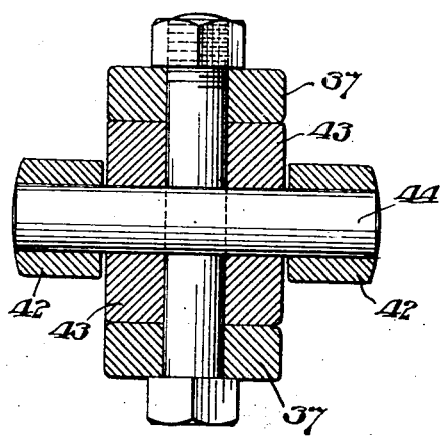
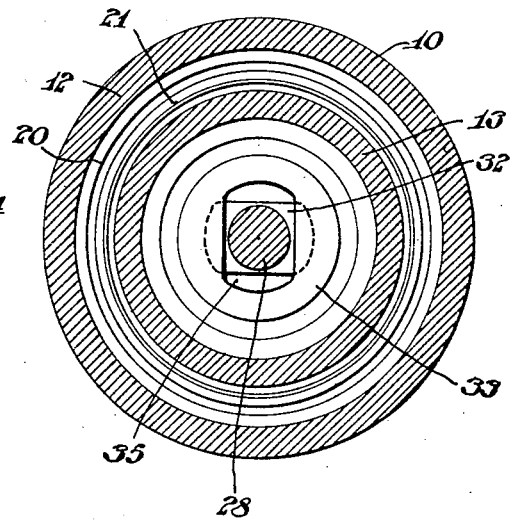
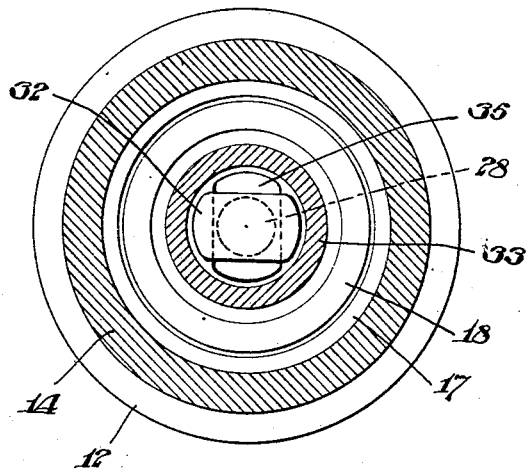
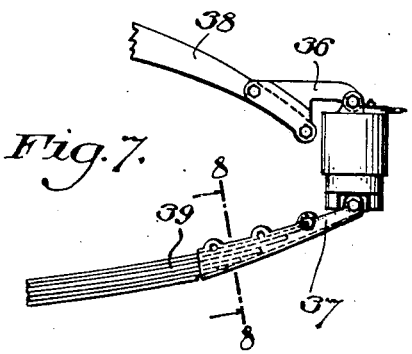
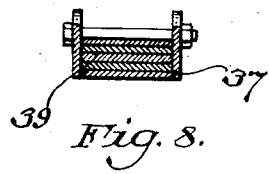
Inventor:
Richard Sefton,
By Jas. C. Nobenswith
Attorney.

Patented Mar. 19, 1929.

1,706,187

UNITED STATES PATENT OFFICE.

RICHARD SEFTON, OF CLEVELAND, OHIO.

PNEUMATIC SPRING.

Application filed August 13, 1926. Serial No. 128,957.

My invention relates to pneumatic springs, and it has particular relation to a device which is adapted to be inserted in place of the shackles which are commonly employed between the end of the spring and the supporting bracket of the chassis of an automobile, to act as an auxiliary spring.

The principal object of my invention is to provide an auxiliary pneumatic spring for automobiles and the like, which will be relatively inexpensive, which will be relatively light in weight, which will be so constructed and arranged that the requisite air pressure will be automatically maintained, which will be automatically lubricated, and which may be readily and easily substituted in place of the ordinary spring shackles of an automobile.

My invention contemplates the provision of an auxiliary air spring adapted to be used in conjunction with the ordinary springs of automobiles, but which is adaptable for embodiment in a structure of less length than the air springs which are at present in common use for such purpose. My invention also contemplates the provision of a structure which may be easily dismantled for the purpose of examination and repair when required.

The nature and characteristic features of my invention will be more readily understood from the following description, taken in connection with the accompanying drawings forming part hereof, in which:

Fig. 4 is a horizontal section taken approximately on the line 4—4 of Fig. 1;

Fig. 5 is a horizontal section taken approximately on the line 5—5 of Fig. 1;

Fig. 6 is a horizontal section looking upwardly, taken approximately on the line 6—6 of Fig. 1;

Fig. 7 is a side elevation illustrating the manner of mounting the pneumatic spring between the free end of the leaf spring commonly employed in an automobile, and the end of the bracket extending from the frame of the automobile chassis; and Fig. 8 is a cross section on the line 8—8 of Fig. 7.

Figures 1, 2:
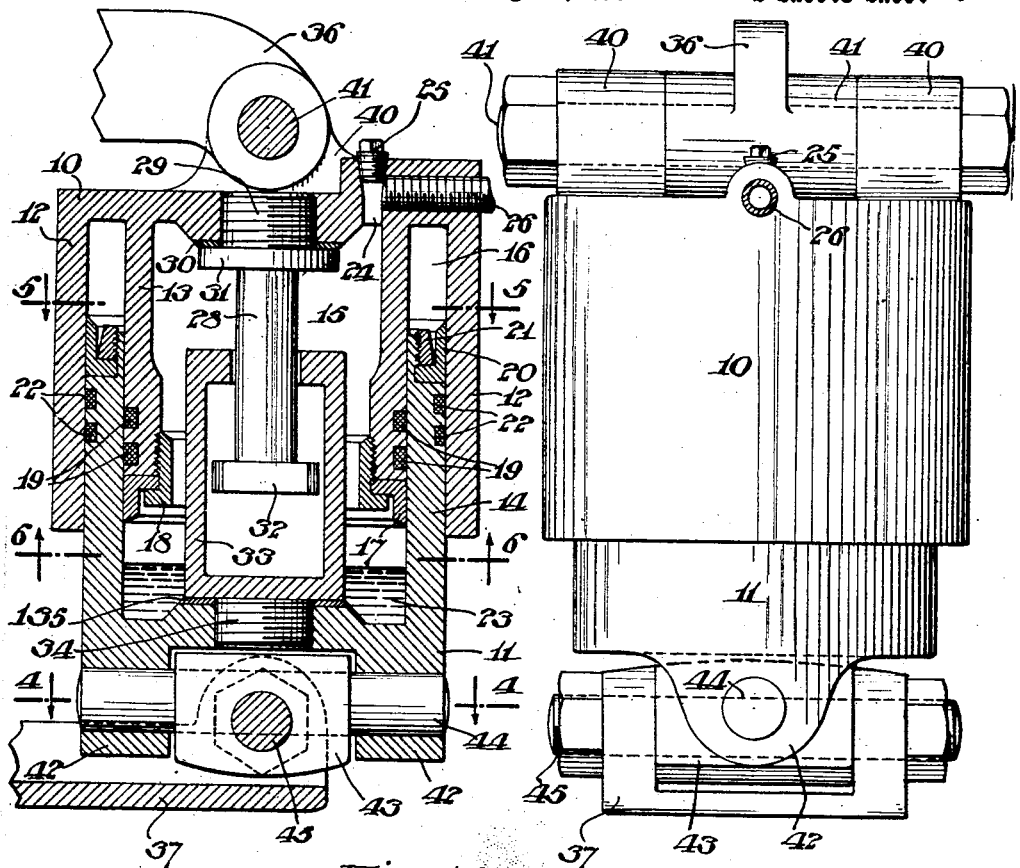
Figure 1 is a vertical central section of a pneumatic spring embodying the main features of my present invention.
Fig. 2 is a rear elevation thereof.
Figure 3:
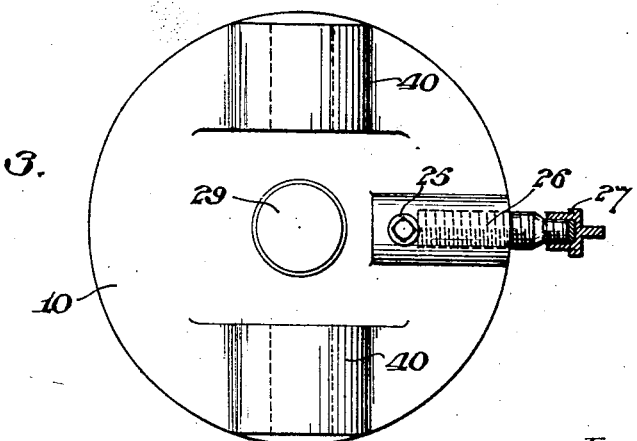
Fig. 3 is a top or plan view thereof.

Referring to the drawings, in the particular embodiment of my invention therein shown, the pneumatic spring comprises two members, 10 and 11, telescopically arranged with respect to each other. The upper member 10 is provided with an outer cylindrical wall 12 and an inner cylindrical wall 13, and the lower member 11 is provided with a cylindrical wall 14 positioned in the space between the outer wall 12 and the inner wall 13 of the upper member 10, whereby there are provided a central air chamber 15 and an annular air chamber 16.

The lower end of the inner wall 13 of the upper member 10 has mounted thereon a cup leather 17, which is held in position by means of a ring member 18, which is threaded on the inner surface of the lower portion of the wall 13. The lip of the cup leather 17 extends downward and bears against the inner surface of the wall 14 of the lower member 11. Mounted near the lower end of the inner wall 13 of the upper member 10 are piston rings 19 of the ordinary type which bear against the inner surface of the wall 14 of the lower member 11.

Mounted at the upper end of the wall 14 of the member 11 is a cup leather 20, which is secured to the upper end of the wall 14 by means of a ring member 21, which is threaded on a suitable annular projection at the upper end of the wall 14 of the member 11. The lip portion of the cup leather 20 extends upward and bears against the inner surface of the outer wall 12 of the upper member 10. There are also provided piston rings 22, of the ordinary type, which are mounted in the wall 14 of the lower member 11 near the upper end thereof, and arranged to bear against the inner surface of the outer wall 12 of the upper member 10.

A quantity of oil 23 is maintained in the lower portion of the lower member 11, and for the purpose of inserting and renewing said oil there is provided in the top of the member 10 an aperture 24, which is normally closed by means of a pipe plug 25 threaded in the upper portion of said aperture.

As will be hereinafter more fully set forth, the chamber 15 is adapted to contain a quantity of air under pressure, and for the purpose of initially supplying said air there is provided a check valve structure 26, which is mounted in the upper portion of the upper member 10. The check valve structure 26 is similar to that commonly employed in the valves of automobile tires. The inner end of the check valve structure 26 communicates with the aperture 24, the arrangement being such that the air under pressure may be supplied to the inner chamber 15 by means of an ordinary automobile pump. A cap member 27, of the type usually employed in connection with automobile tire valves, is mounted on the end of the check valve structure 26, serving to close the end of the check valve structure during the normal operation of the device.

Centrally mounted in the interior of the upper member 10 is a bolt 28. The bolt 28 has a threaded portion 29 which engages a complementally threaded aperture in the head of the upper member 10. A gasket 30 is interposed under a flanged portion 31 of the bolt 28 to prevent leakage. The lower end of the bolt 28 is provided with a T head 32, which is positioned in the hollow interior of a cylindrical member 33, which is mounted by means of a threaded portion 34 in the lower head of the lower member 11. A gasket 135 is interposed between a shouldered portion of the cylindrical member 33 and the inner surface of the lower head of the lower member 11, this gasket 135 serving to prevent leakage at the place where the cylindrical member 33 is attached to the lower head of the lower member 11.

The upper end of the cylindrical member 33 is provided with an aperture 35, which is complemental in shape to the T head 32 of the bolt 28, whereby said head may be inserted in the interior of the cylindrical member 33 and confined therein when the parts are turned ninety degrees with respect to each other (see Fig. 6). The arrangement is such that the T head 32 will serve to prevent the member 10 and 11 from becoming separated when the device is mounted on the automobile, as will be hereinafter more fully set forth, and also the parts are so proportioned as to prevent the members 10 and 11 from telescoping to such an extent as would cause the cup leather 21 to be destroyed.

For the purpose of mounting the device in the place of the usual spring shackles on the automobile, there are provided auxiliary brackets 36 and 37. The auxiliary bracket 36 is adapted to be secured to the end of the projecting arm 38 of the chassis frame, and the auxiliary bracket 37 is likewise adapted to be secured to the free end of the spring 39. The upper portion of the upper member 10 is provided with ears 40, which are connected by means of a bolt 41 to the projecting portion of the auxiliary bracket 36. The lower end of the lower member 11 is provided with ears 42, and a block 43 is pivotally associated therewith by means of a pin 44. The pin 44 is maintained in its proper relationship with the ears 42 and block 43 by means of a transversely extending bolt 45, which also serves as a means for attaching the block 43 to the projecting end of the auxiliary bracket 37.

By the foregoing arrangement, the lower end of the device will be connected by means of a universal joint to the free end of the spring, thereby to permit greater flexibility and freedom of the parts in operation.

It should be noted that the auxiliary bracket 37 extends under a plurality of the leaves of the automobile spring, and the action is such that when the automobile spring is depressed the leaves of the spring will freely slide upon each other, but, on the other hand, when the body of the car rebounds, a snubbing action will take place in connection with the spring by reason of the bracket member 37 confining the leaves of the spring to each other on the upward motion.

In the use of the device, a quantity of air under pressure is initially pumped into the central chamber 15 through the check valve structure 26. An ordinary automobile pump, or other means for supplying air under pressure, may be employed for this purpose. Sufficient pressure is imparted to initially position the upper and lower members with respect to each other in substantially the positions shown in Fig. 1 of the drawings. It will be readily understood, however, that when the automobile upon which the device is mounted is in use, a certain amount of oscillation of the parts with respect to each other will take place, and any leakage of the confined air which will ordinarily occur will be taken care of by a certain amount of air being entrapped within the annular space 16 and thence forced to the interior chamber 15. The employment of the piston rings 19 and 22 will minimize the amount of air which would ordinarily be pumped to the interior chamber, yet will permit such a limited quantity to pass merely to maintain the air within the chamber 15 at the requisite pressure.

It should be understood that when the pressure in the central chamber 15 is approximately the requisite amount, the oscillations between the upper and lower members 10 and 11 will not be so pronounced as to pump any additional air into the central chamber, but if the pressure should fall below the requisite amount, the oscillations will be more violent, and consequently air will be pumped into the central chamber until the requisite amount is restored. It has been found in practice that, by the piston rings 19 being associated with the cup leather 17, and the piston rings 22 being associated with the cup leather 20, the proper pressure will be readily secured and maintained.

In the normal operation of the device, when the parts become distended with respect to each other, a partial vacuum is created in the annular space 16, which will serve to retard the separation of these parts. The complete separation of the upper and lower members will be prevented by the bolt 28, having the T head 32 which coacts with the cylindrical member 33, as hereinbefore described. When, however, it is desired to separate the upper and lower members 10 and 11, for the purpose of inspection or repair, the device is removed from the automobile, the bolts 41 and 45 being removed for this purpose, after which the parts 10 and 11 may be axially rotated ninety degrees with respect to each other, so as to permit the T head 32 of the bolt 28 to pass through the aperture 35 in the upper end of the cylindrical member 33, whereupon the upper and lower members may be readily separated and access thus had to the interior of the structure.

It will also be understood that the oscillations which normally take place in the operation of the device will cause the oil 23 retained by the chamber 15 to be splashed about, and thus lubricate the working surfaces.

Having thus described the nature and characteristic features of my invention, what I claim as new and desire to secure by Letters Patent, is:

1. A pneumatic spring comprising upper and lower members telescopically arranged with respect to each other, the upper member being provided with an outer cylindrical wall and an inner cylindrical wall, and the lower member being provided with a cylindrical wall positioned in the space between the inner and outer walls of the upper member, thereby to provide a central air chamber and an annular air chamber, a cup leather carried by the inner wall of the upper member, piston rings mounted in the inner wall of the upper member above said cup leather, said cup leather and piston rings bearing against the inner surface of the wall of the lower member, a cup leather carried by the wall of the lower member, and piston rings mounted in the wall of the lower member below the cup leather carried thereby, said cup leather and piston rings bearing against the inner surface of the outer wall of the upper member.

2. A pneumatic spring comprising upper and lower members telescopically arranged with respect to each other, the upper member being provided with an outer cylindrical wall and an inner cylindrical wall, and the lower member being provided with a cylindrical wall positioned in the space between the inner and outer walls of the upper member, thereby to provide a central air chamber and an annular air chamber, a cup leather carried by the inner wall of the upper member, piston rings mounted in the lower portion of the inner wall of the upper member above said cup leather, said cup leather and piston rings bearing against the inner surface of the wall of the lower member, a cup leather carried by the wall of the lower member, and piston rings mounted in the upper portion of the wall of the lower member below the cup leather carried thereby, said cup leather and piston rings bearing against the inner surface of the outer wall of the upper member.

3. A pneumatic spring comprising upper and lower members telescopically arranged with respect to each other, the upper member being provided with an outer cylindrical wall and an inner cylindrical wall, and the lower member being provided with a cylindrical wall positioned in the space between the inner and outer walls of the upper member, thereby to provide a central air chamber and an annular air chamber, a cup leather carried by the inner wall of the upper member, piston rings mounted in the inner wall of the upper member above said cup leather, said cup leather and piston rings bearing against the inner surface of the wall of the lower member, a cup leather carried by the wall of the lower member, piston rings mounted in the wall of the lower member below the cup leather carried thereby, said cup leather and piston rings bearing against the inner surface of the outer wall of the upper member, and a check valve mounted in the upper member whereby air under pressure may be initially supplied to the central chamber.

4. A pneumatic spring comprising upper and lower members telescopically arranged with respect to each other, the upper member being provided with an outer cylindrical wall and an inner cylindrical wall, and the lower member being provided with a cylindrical wall positioned in the space between the inner and outer walls of the upper member, thereby to provide a central air chamber and an annular air chamber, a cup leather carried by the inner wall of the upper member, piston rings mounted in the lower portion of the inner wall of the upper member above said cup leather, said cup leather and piston rings bearing against the inner surface of the wall of the lower member, a cup leather carried by the wall of the lower member, piston rings mounted in the upper portion of the wall of the lower member below the cup leather carried thereby, said cup leather and piston rings bearing against the inner surface of the outer wall of the upper member, and a check valve mounted in the upper member whereby air under pressure may be initially supplied to the central chamber.

5. In a device of the character described, upper and lower members telescopically arranged with respect to each other forming compressible and extensible air chambers, and means for preventing improper separation of the members comprising a bolt carried by one of said members and having a T head on the free end thereof, the other of said members having a hollow member mounted therein, the upper end of the hollow member being provided with an elongated aperture through which the T head is adapted to be inserted and withdrawn when the parts are turned with respect to each other on their common axis, and the T head of the bolt being confined within the hollow member when the parts are in their normal operative positions.

6. In a device of the character described, upper and lower members telescopically arranged with respect to each other forming compressible and extensible air chambers, and means for preventing improper separation of the members comprising a centrally located bolt carried by one of said members and having a T head on the free end thereof, the other of said members having a hollow member mounted therein in axial alinement with said bolt the upper end of the hollow member being provided with an elongated aperture through which the T head is adapted to be inserted and withdrawn when the parts are turned with respect to each other on their common axis, and the T head of the bolt being confined within the hollow member when the parts are in their normal operative positions.

7. In a device of the character described, upper and lower members telescopically arranged with respect to each other forming compressible and extensible air chambers, and means for limiting the longitudinal movement of the members with respect to each other comprising a bolt carried by one of said members and having a T head on the free end thereof, the other of said members having a hollow member mounted therein, the upper end of the hollow member being provided with an elongated aperture through which the T head is adapted to be inserted and withdrawn when the parts are turned with respect to each other on their common axis, and the T head of the bolt being confined within the hollow member when the parts are in their normal operative positions and adapted to contact with the ends of the interior of the hollow member thereby to limit the relative movement of the members.

8. In a device of the character described, upper and lower members telescopically arranged with respect to each other forming compressible and extensible air chambers, and means for limiting the longitudinal movement of the members with respect to each other comprising a bolt carried by one of said members and having an enlarged head on the free end thereof, the other of said members having a hollow member mounted therein, and the head of the bolt being confined within the hollow member when the parts are in their normal operative positions and adapted to contact with the respective ends of the interior of the hollow member thereby to limit the relative movement of the members.

In testimony whereof, I have hereunto signed my name.

RICHARD SEFTON.